United States Patent
Kim et al.

(10) Patent No.: US 10,282,584 B1
(45) Date of Patent: *May 7, 2019

(54) METHOD AND APPARATUS FOR REDUCING FINGERPRINT IMAGE DISTORTION

(71) Applicant: SecuGen Corporation, Santa Clara, CA (US)

(72) Inventors: Chong Soo Kim, Gyeonggi-do (KR); Sang Hoon Shin, Gyeonggi-do (KR); Sang Hoon Lee, Santa Clara, CA (US); Dong Won Lee, San Jose, CA (US)

(73) Assignee: SecuGen Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,381

(22) Filed: Jan. 28, 2019

Related U.S. Application Data

(63) Continuation of application No. 16/017,223, filed on Jun. 25, 2018, now Pat. No. 10,235,557.

(60) Provisional application No. 62/614,755, filed on Jan. 8, 2018.

(51) Int. Cl.
  *G06K 9/00* (2006.01)
(52) U.S. Cl.
  CPC ............... *G06K 9/00046* (2013.01)
(58) Field of Classification Search
  CPC .................. G06K 9/00013–00046
  See application file for complete search history.

(56) References Cited

U.S. PATENT DOCUMENTS

| | | | | |
|---|---|---|---|---|
| 3,975,711 A * | 8/1976 | McMahon | ............ | A61B 5/1172 382/126 |
| 6,154,285 A * | 11/2000 | Teng | .................... | A61B 5/1172 356/445 |
| 6,185,319 B1 * | 2/2001 | Fujiwara | ............ | G06K 9/00013 356/71 |
| 6,259,108 B1 * | 7/2001 | Antonelli | ........... | G06K 9/00026 250/556 |
| 6,282,303 B1 * | 8/2001 | Brownlee | ............ | A61B 5/1172 345/163 |
| 6,414,749 B1 * | 7/2002 | Okamoto | ........... | G06K 9/00046 356/71 |
| 6,750,955 B1 * | 6/2004 | Feng | .................. | G06K 9/00046 356/71 |

(Continued)

*Primary Examiner* — Sean T Motsinger
(74) *Attorney, Agent, or Firm* — Silicon Valley Patent Group LLP; Thomas Chan

(57) ABSTRACT

Methods and apparatuses are provided for reducing fingerprint image distortion. In one embodiment, a fingerprint sensing apparatus comprises an image sensor configured to capture a fingerprint image from a reflected light of the fingerprint, and a mirror and a lens in the light path between the prism and the image sensor to direct the reflected light of the fingerprint image from the prism to the image sensor. The image sensor is configured to provide an image plane, the prism and the mirror are configured to provide a subject plane, where the subject plane is adjusted based on a light path from a prism to the image sensor, and the image plane and the subject plane are extended and are configured to form an intersection, and the lens is adjusted to provide a lens plane that meets the intersection of the image plane and the subject plane.

21 Claims, 15 Drawing Sheets

(56) References Cited

U.S. PATENT DOCUMENTS

| | | | | |
|---|---|---|---|---|
| 7,212,279 | B1* | 5/2007 | Feng | G06K 9/00046 356/71 |
| 9,400,916 | B1* | 7/2016 | Brownlee | A61B 5/1172 |
| 2003/0133103 | A1* | 7/2003 | Arnold | G06K 9/00046 356/237.2 |
| 2003/0206287 | A1* | 11/2003 | McClurg | G06K 9/00046 356/71 |
| 2004/0130908 | A1* | 7/2004 | McClurg | G02B 5/021 362/555 |
| 2004/0252867 | A1* | 12/2004 | Lan | G06K 9/0004 382/124 |
| 2004/0257627 | A1* | 12/2004 | McClurg | G06K 9/00046 358/509 |
| 2005/0041410 | A1* | 2/2005 | Yamashita | G02B 5/30 362/620 |
| 2005/0094128 | A1* | 5/2005 | Carver | G06K 9/00046 356/71 |
| 2005/0264878 | A1* | 12/2005 | Plummer | G02B 5/04 359/387 |
| 2006/0291704 | A1* | 12/2006 | McClurg | G06K 9/00046 382/127 |
| 2009/0316430 | A1* | 12/2009 | Chuang | G02B 3/0043 362/606 |
| 2010/0328575 | A1* | 12/2010 | Shinkai | G02B 5/0215 349/62 |
| 2014/0023249 | A1* | 1/2014 | Higuchi | G06K 9/00046 382/127 |
| 2015/0022648 | A1* | 1/2015 | Kim | G06K 9/00046 348/77 |
| 2016/0292491 | A1* | 10/2016 | Dickerson | G06K 9/00046 |

* cited by examiner

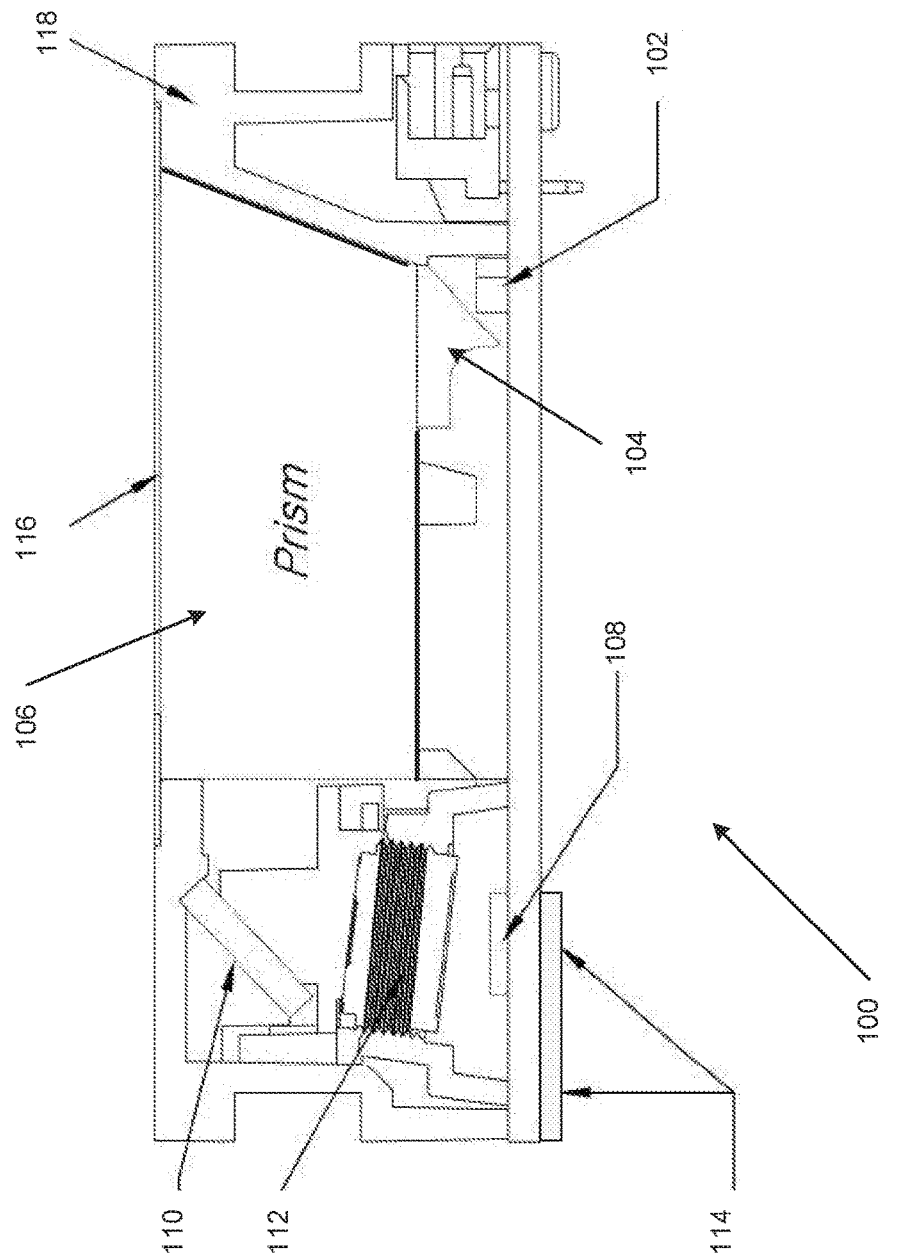

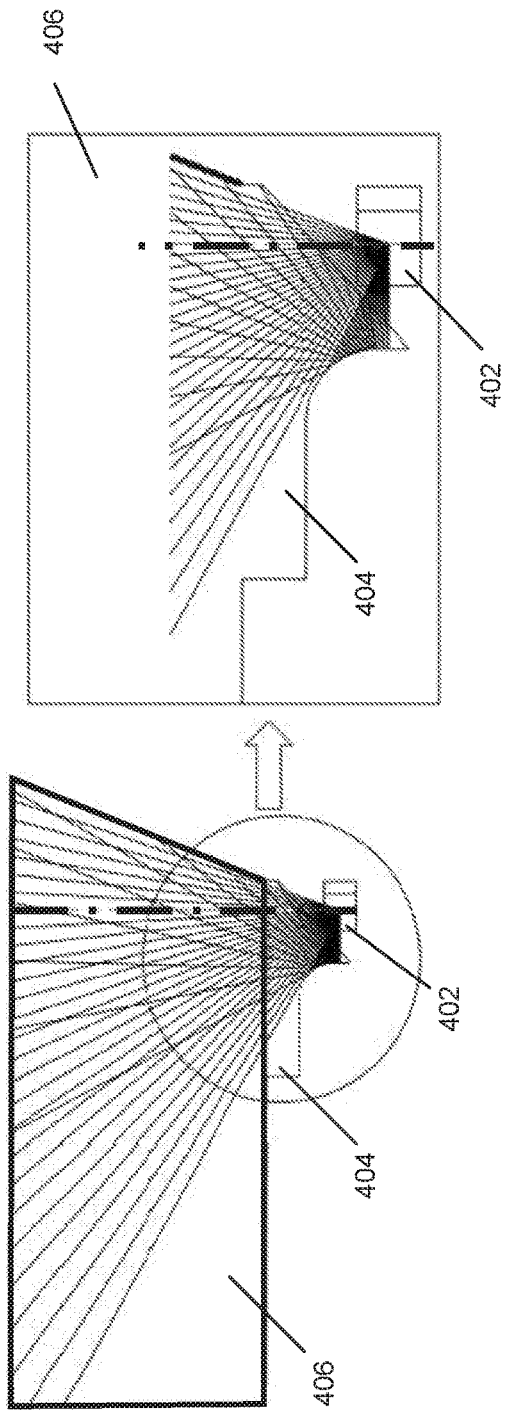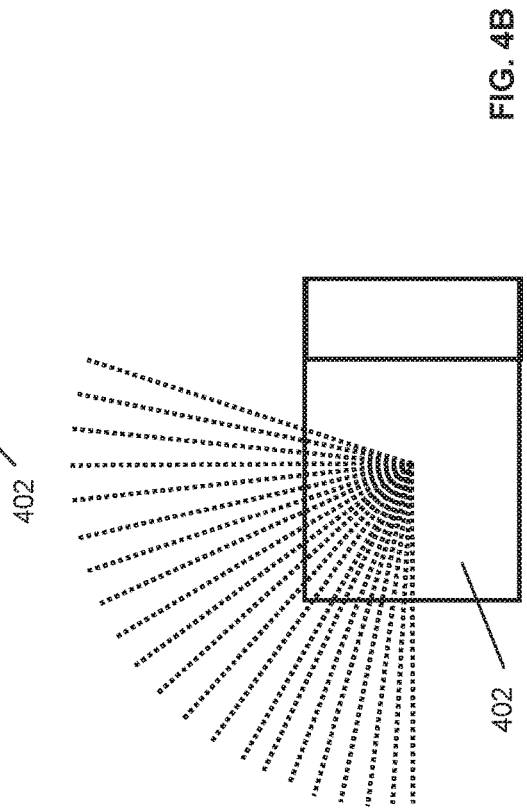
FIG. 4A
FIG. 4B

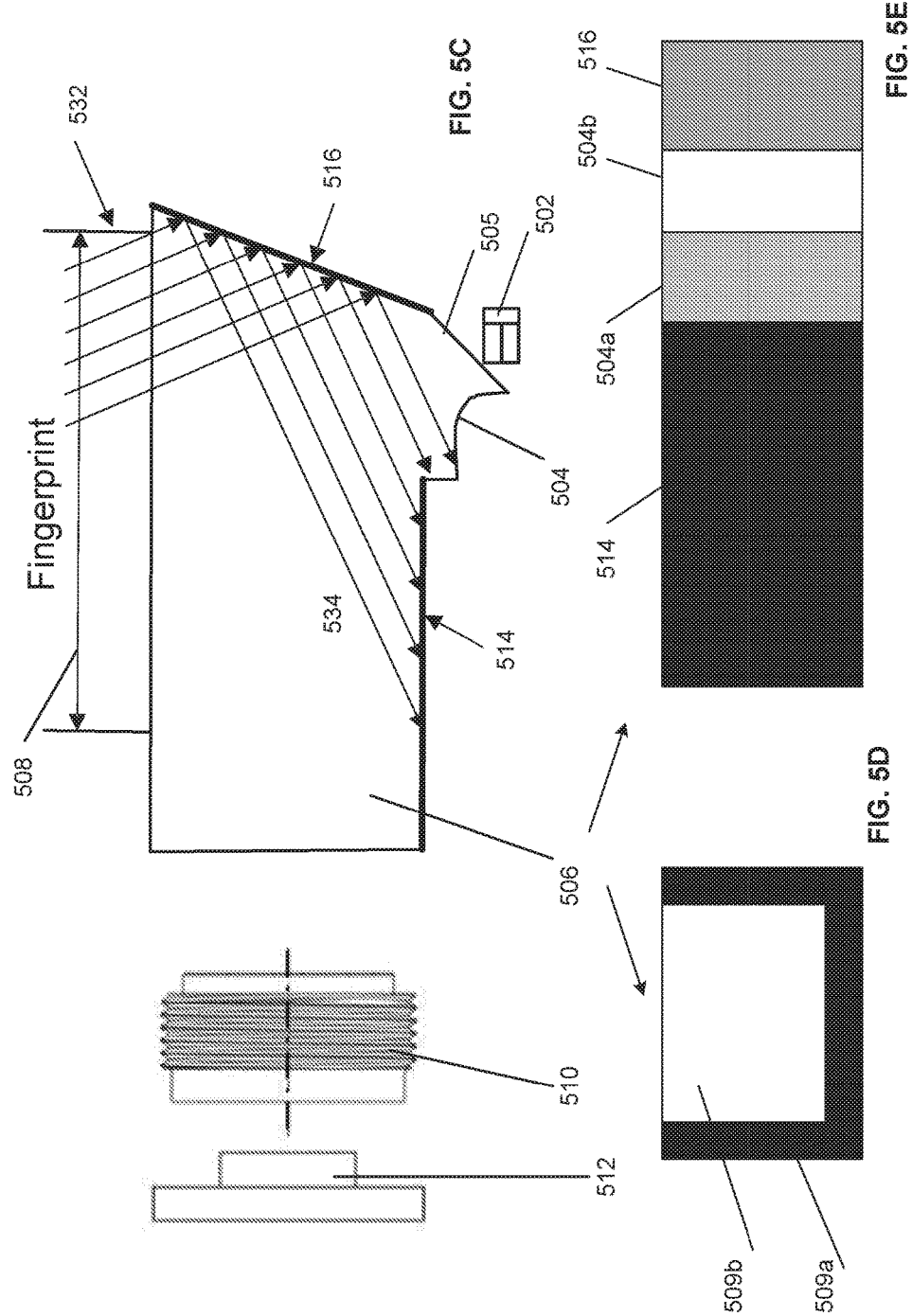

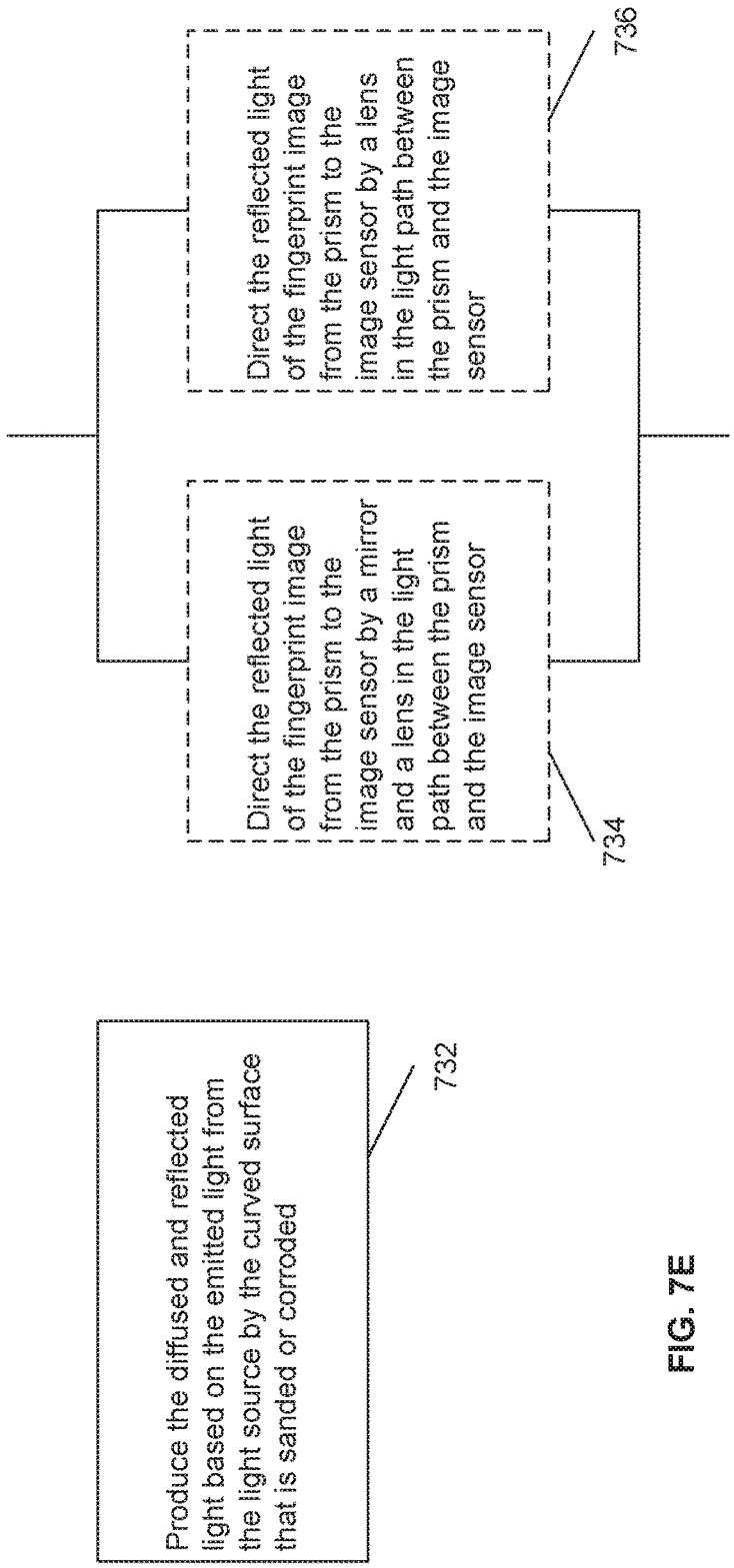

_US 10,282,584 B1_

METHOD AND APPARATUS FOR REDUCING FINGERPRINT IMAGE DISTORTION

CROSS-REFERENCE TO RELATED APPLICATIONS

This application is a continuation of U.S. patent application Ser. No. 16/017,223, "Method and Apparatus for Sensing Fingerprint," filed Jun. 25, 2018, which claims the benefit of U.S. patent application No. 62/614,755, "Method and Apparatus for Sensing Fingerprint," filed Jan. 8, 2018, which is assigned to the assignee hereof. The aforementioned United States patent applications are hereby incorporated by reference in their entirety.

FIELD

The present invention relates to the field of fingerprint detection system. In particular, the present invention relates to method and apparatus for reducing fingerprint image distortion.

BACKGROUND

FIG. 8 illustrates a conventional approach of performing fingerprint sensing. In FIG. 8, a light source 802 produces an emitted light that shines through a prism 806 to illuminate a fingerprint 808 (represented by the double arrow) of a user. The prism 806 directs a reflected light of the fingerprint towards an image sensor 812 through a lens 810. The image sensor 812 captures a fingerprint image from the reflected light of the fingerprint 808. There are drawbacks with the conventional approach shown in FIG. 8. First, the center of the fingerprint, being closer to the light source, receives a higher illumination intensity, while the edges of the fingerprint, being further away from the light source, receive a lower illumination intensity. These differences in illumination intensity result in deterioration in the image quality of the captured fingerprint image. In addition, since the light sources shines directly at the fingerprint image, it produces a lower contrast between the ridges and valleys of the captured fingerprint image, which also results in deterioration in the image quality of the captured fingerprint image. Therefore, it is desirable to have an improved method and apparatus for sensing fingerprint that can address the drawbacks of the conventional approach of performing fingerprint sensing.

SUMMARY

Methods and apparatuses are provided for reducing fingerprint image distortion. In one embodiment, a fingerprint sensing apparatus may include a light source configured to produce an emitted light to illuminate a fingerprint of a user, a light modifier configured to illuminate the fingerprint with a substantially uniform light intensity using the emitted light from the light source, where the light modifier includes a curved surface configured to produce a diffused and reflected light based on the emitted light from the light source, a prism configured to direct a reflected light of the fingerprint illuminated by the diffused and reflected light from the light modifier, an image sensor configured to capture a fingerprint image from the reflected light of the fingerprint, a mirror and a lens in the light path between the prism and the image sensor, to direct the reflected light of the fingerprint image from the prism to the image sensor, and a housing configured to hold the light source, the light modifier, the prism, and the image sensor within the housing. The image sensor is configured to provide an image plane. The prism and the mirror are configured to provide a subject plane, where the subject plane is adjusted based on the light path from the prism to the image sensor. The image plane and the subject plane are extended and are configured to form an intersection. The lens is adjusted to provide a lens plane that meets the intersection of the image plane and the subject plane.

In another embodiment, a fingerprint sensing apparatus may include a light source configured produce an emitted light to illuminate a fingerprint of a user, a light modifier prism configured to illuminate the fingerprint with a substantially uniform light intensity using the emitted light from the light source, where the light modifier prism includes a curved surface configured to produce a diffused and reflected light based on the emitted light from the light source, the light modifier prism is further configured to direct a reflected light of the fingerprint illuminated by the diffused and reflected light, an image sensor configured to capture a fingerprint image from the reflected light of the fingerprint, a mirror and a lens in the light path between the light modifier prism and the image sensor to direct the reflected light of the fingerprint image from the light modifier prism to the image sensor, and a housing configured to hold the light source, the light modifier prism, and the image sensor within the housing. The image sensor is configured to provide an image plane. The light modifier prism and the mirror are configured to provide a subject plane, where the subject plane is adjusted based on the light path from the light modifier prism to the image sensor, and where the image plane and the subject plane are extended and are configured to form an intersection. The lens is adjusted to provide a lens plane that meets the intersection of the image plane and the subject plane.

In yet another embodiment, a method for reducing fingerprint image distortion includes producing, by a light source, an emitted light to illuminate a fingerprint of a user, illuminating, by a light modifier, the fingerprint with a substantially uniform light intensity using the emitted light from the light source, where the light modifier includes a curved surface configured to produce a diffused and reflected light based on the emitted light from the light source, directing, by a prism, a reflected light of the fingerprint illuminated by the diffused and reflected light from the light modifier, directing, by a mirror and a lens in the light path between the prism and an image sensor, the reflected light of the fingerprint image from the prism to the image sensor, and capturing, by the image sensor, a fingerprint image from the reflected light of the fingerprint. The image sensor is configured to provide an image plane. The prism and the mirror are configured to provide a subject plane, where the subject plane is adjusted based on the light path from the prism to the image sensor, and the image plane and the subject plane are extended and are configured to form an intersection. The lens is adjusted to provide a lens plane that meets the intersection of the image plane and the subject plane.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings.

FIG. 1 illustrates an exemplary fingerprint sensing apparatus according to aspects of the present disclosure.

FIG. 4A illustrates an exemplary portion of a light path produced by a light source, a light modifier and a prism according to aspects of the present disclosure. FIG. 4B illustrates a side view of a light source according to aspects of the present disclosure.

FIG. 5C illustrates a method of reducing ambient background noise in a fingerprint sensing apparatus according to aspects of the present disclosure.

FIG. 5D illustrates a side view of the prism of the fingerprint sensing apparatus according to aspects of the present disclosure.

FIG. 5E illustrates a top view of the fingerprint sensing apparatus according to aspects of the present disclosure.

FIG. 7E illustrates another exemplary method of using the light modifier of the fingerprint sensing apparatus according to aspects of the present disclosure.

FIG. 7F illustrates exemplary methods of using the fingerprint sensing apparatus according to aspects of the present disclosure.

DESCRIPTION OF EMBODIMENTS

Figure 2A:
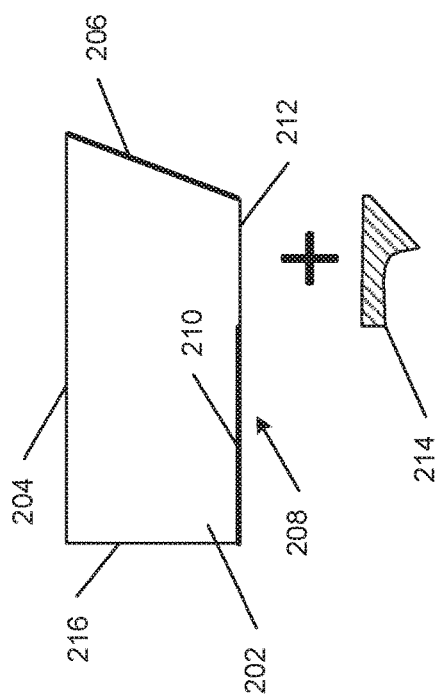
FIG. 2A illustrates an exemplary implementation of a prism with a light modifier according to aspects of the present disclosure.

Methods and apparatuses are provided for a fingerprint sensing apparatus. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

FIG. 1 illustrates an exemplary fingerprint sensing apparatus according to aspects of the present disclosure. In the example shown in FIG. 1, the fingerprint sensing apparatus 100 includes a light source 102, a light modifier 104, a prism 106, an image sensor 108, a mirror 110, a lens 112, a printed circuit board 114, a platen 116 for finger placement, and a housing 118. The light source 102, light modifier 104, prism 106, image sensor 108, mirror 110, lens 112, printed circuit board 114, platen 116 and various other components are assembled within the housing 118 and arranged in the manner shown in FIG. 1.

According to aspects of the present disclosure, the light source 102 is configured produce an emitted light to illuminate a fingerprint of a user. The light modifier 104 is configured to illuminate the fingerprint with a substantially uniform light intensity using the emitted light from the light source, where the light modifier 104 includes a curved surface configured to produce a diffused and reflected light based on the emitted light from the light source. The prism 106 is configured to direct a reflected light of the fingerprint illuminated by the diffused and reflected light from the light modifier 104. The image sensor 108 is configured to capture a fingerprint image from the reflected light of the fingerprint. The platen 116 is configured to be touched by a fingerprint of a user. The housing 118 is configured to hold the light source, the light modifier, the prism, and the image sensor within the housing.

Figure 8:
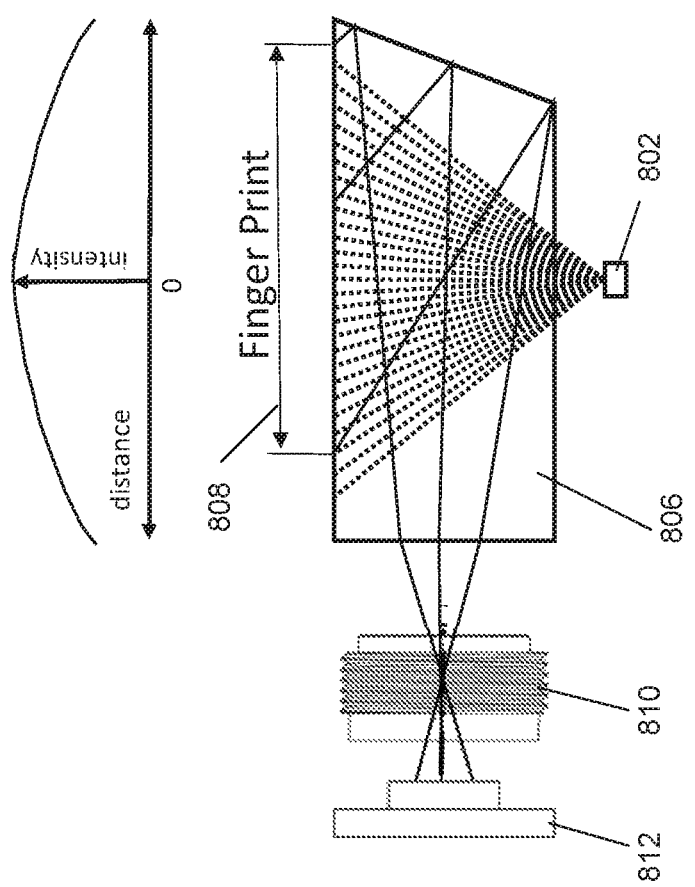
FIG. 8 illustrates a conventional approach of performing fingerprint sensing.

In some implementations, the mirror 110 and the lens 112 in the light path between the prism 106 and the image sensor 108, where the mirror 110 and the lens 112 are configured to direct the reflected light of the fingerprint image from the prism 106 to the image sensor 108. A printed circuit board 114 may be attached to the housing 118, where the printed circuit board may include integrated circuit components, such as microprocessor(s), static and dynamic memory, application specific integrated circuits, that can be configured to support various applications of the fingerprint sensing apparatus 100. Note that the dotted line in the prism 106 indicates the light modifier 104 and the prism 106 may be implemented as a single component or as two separate components. Details of this implementation is further described in association with FIG. 2A and FIG. 2B below. With the disclosed approach, the fingerprint sensing apparatus can achieve a more uniform illumination intensity of the fingerprint image as compared to the conventional approach discussed above in association with FIG. 8. In addition, the fingerprint image captured by the disclosed fingerprint sensing apparatus can achieve a higher contrast between the ridges and valleys, and thus lead to a high quality captured fingerprint image.

FIG. 2A illustrates an exemplary implementation of a prism with a light modifier according to aspects of the present disclosure. As shown in FIG. 2A, the prism 202 includes a contacting surface 204, a mirror coated surface 206, a light source interface surface 208, and a sensor interface surface 216.

The contacting surface 204 is configured to be touched by a user. The mirror coated surface 206 is configured to direct the reflected light of the fingerprint to the image sensor. The mirror coated surface is further configured to reduce differences in length of light paths between the fingerprint of the user and the image sensor. A first section 210 of the light source interface surface 208 is painted black to reduce background noise by absorbing ambient light received from the contacting surface. A second section 212 of the light source interface surface 208 is configured to be attached to a light modifier 214. The sensor interface surface 216 is configured to pass the reflected light of the fingerprint from the mirror coated surface to the image sensor. The present disclosure further improves the captured fingerprint image by absorbing the ambient light entered from the contacting surface of the fingerprint sensing apparatus.

Figure 2B:
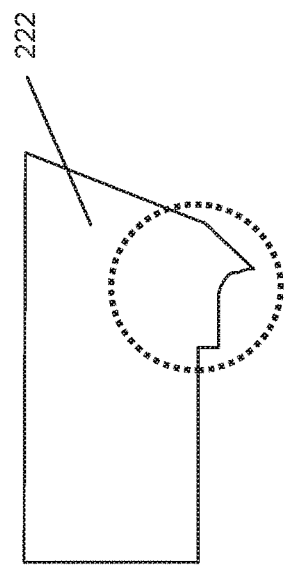
FIG. 2B illustrates another exemplary implementation that combines the prism and the light modifier of FIG. 2A as one unit according to aspects of the present disclosure.

FIG. 2B illustrates another exemplary implementation that combines the prism and the light modifier of FIG. 2A as one unit, labelled as a light modifier prism 222, according to aspects of the present disclosure. The dotted circle identifies the region where the prism and the light modifier are combined in the light modifier prism 222.

Figure 3A:
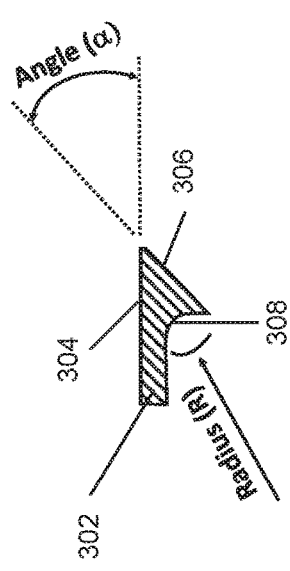
FIG. 3A illustrates a light modifier according to aspects of the present disclosure.

FIG. 3A illustrates a light modifier according to aspects of the present disclosure. In the example shown in FIG. 3A, the light modifier 302 includes a first surface 304, a second surface 306, and a curved surface 308. The first surface 304 is configured to attach the light modifier to a prism. The second surface 306 is configured to receive the emitted light from a light source, where the second surface 306 of the light modifier 302 is further configured to refract an emitted light received from the light source to the curved surface 308 of the light modifier 302. In some implementations, the second surface 306 of the light modifier 302 is sanded to produce a diffused and refracted light using the emitted light from the light source. The first surface 304 and the second surface 306 are orientated at angle as shown in FIG. 3A. In other implementations, the second surface 306 of the light modifier 302 can be corroded instead of sanding, when the light modifier is produced by an injection molding.

According to aspects of the present disclosure, the curved surface 308 is configured to produce a diffused and reflected light based on the emitted light from the light source. In some implementations, the curved surface 308 is sanded to produce a diffused and reflected light based on an emitted light from the light source. In other implementations, the curved surface 308 of the light modifier 302 can be corroded instead of sanding, when the light modifier is produced by an injection molding. A portion of the curved surface 308 is formed with a portion of a circle with a radius R.

Figure 3B:
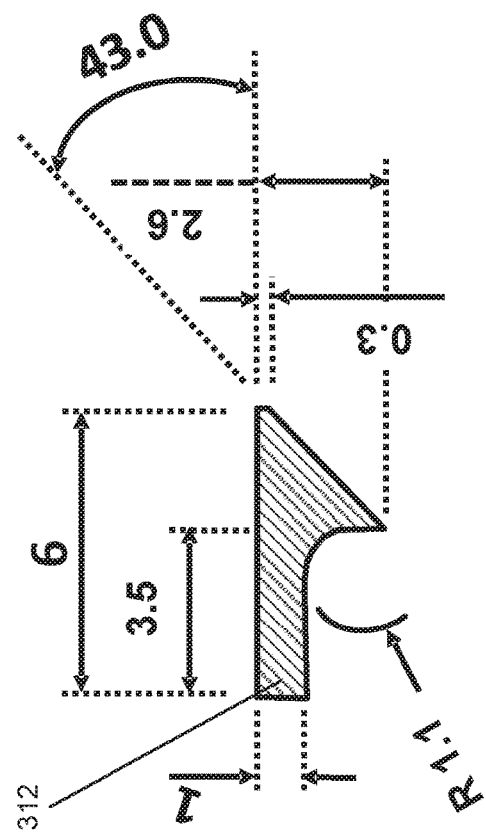
FIG. 3B illustrates a cross-section view of a light modifier according to aspects of the present disclosure.

FIG. 3B illustrates a cross-section view of a light modifier according to aspects of the present disclosure. In one particular implementation, the dimensions of the light modifier 312 are represented by numerals measured in millimeters. The angle between the first surface and the second surface of the light modifier is approximately 43.0 degrees. The curved surface includes one section that has a radius of 1.1 millimeter.

FIG. 4A illustrates an exemplary portion of a light path produced by a light source 402, a light modifier 404 and a prism 406 according to aspects of the present disclosure. FIG. 4B illustrates a side view of a light source 402 according to aspects of the present disclosure. According to aspects of the present disclosure, a size of the light modifier 404, a distance between the light modifier 404 and the light source 402, and an orientation of the light source 402 are configured to illuminate a fingerprint with the substantially uniform light intensity.

Figure 5A:
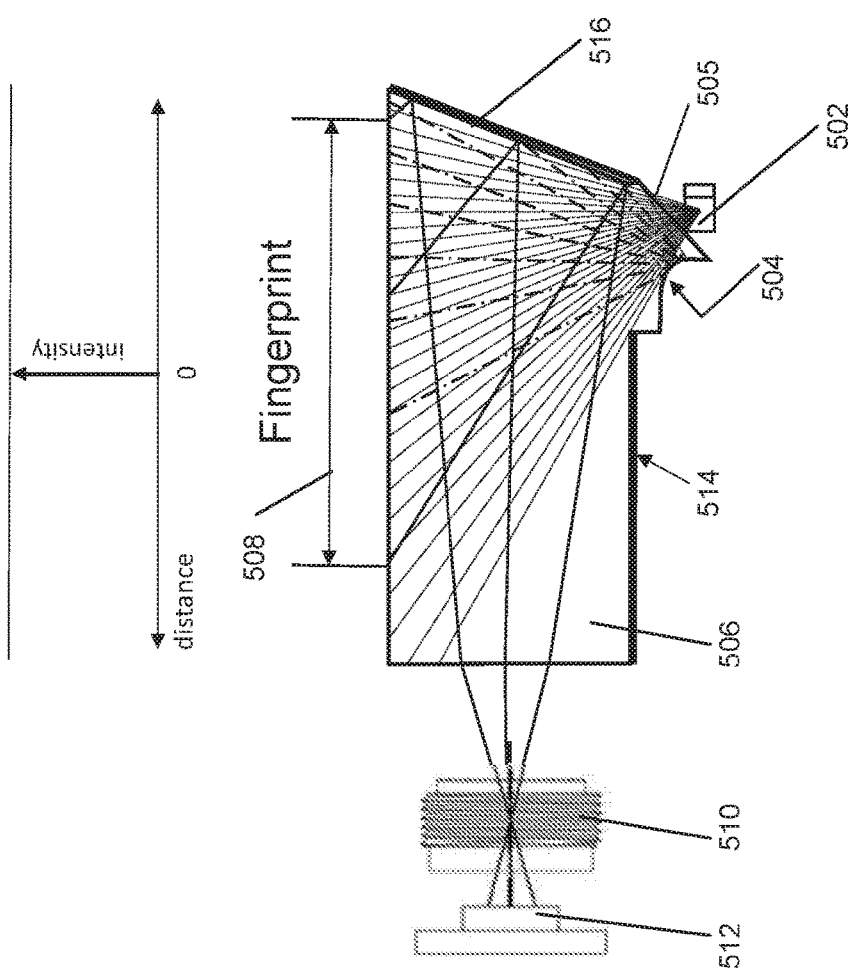
FIG. 5A illustrates an exemplary operation a fingerprint sensing apparatus according to aspects of the present disclosure.

FIG. 5A illustrates an exemplary operation a fingerprint sensing apparatus according to aspects of the present disclosure. In the example of FIG. 5A, a light source 502 produces an emitted light. A light modifier 504 uses the emitted light from the light source 502 to produce a diffused and reflected light to illuminate a fingerprint 508 (represented by the double arrow) of a user through prism 506. The emitted light enters the light modifier 504 through an angled surface 505 of the light modifier. The prism 506 directs a reflected light of the fingerprint towards an image sensor 512 through a lens 510. The image sensor 512 captures a fingerprint image from the reflected light of the fingerprint 508. 514 represents a first section of a light source interface surface of the prism 506, which is painted black to reduce background noise by absorbing ambient light received from the background. 516 represents a mirror coated surface of the prism 506, which directs the reflected light of the fingerprint to the image sensor 512. According to aspects of the present disclosure, the components of the fingerprint sensing apparatus can be adjusted to illuminate the fingerprint with a substantially uniform light intensity throughout the area covered by the fingerprint. In addition, the size of the light modifier, the distance between the light modifier and the light source, and the orientation of the light source can also be adjusted to illuminate the fingerprint with the substantially uniform light intensity.

Figure 5B:
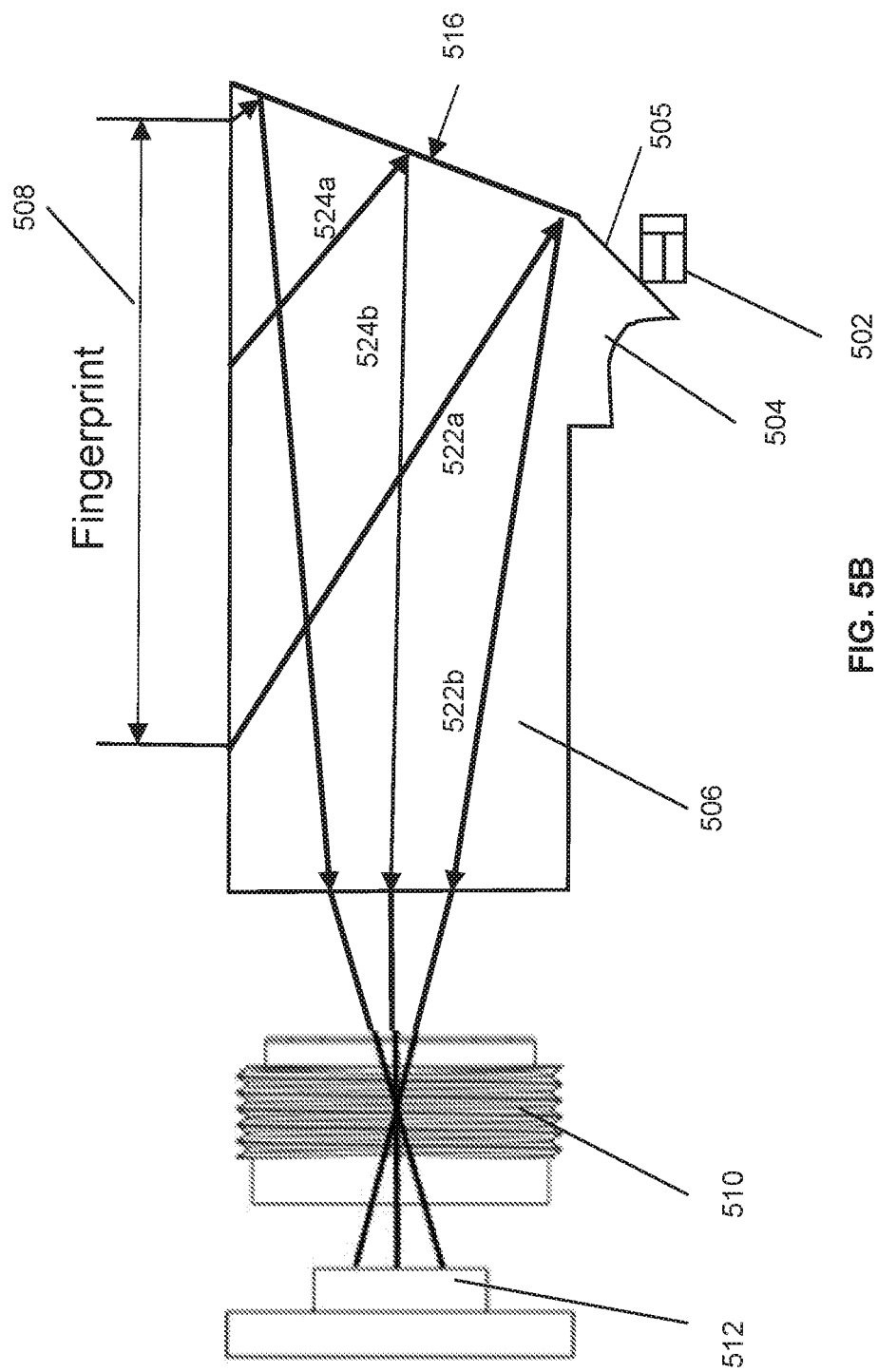
FIG. 5B illustrates yet another exemplary operation of a fingerprint sensing apparatus after the fingerprint has been illuminated according to aspects of the present disclosure.

FIG. 5B illustrates yet another exemplary operation of a fingerprint sensing apparatus after the fingerprint has been illuminated according to aspects of the present disclosure. The components of the fingerprint sensing apparatus shown in FIG. 5B are the same as in FIG. 5A, and thus their descriptions are not repeated here. As shown in FIG. 5B, the size of the prism 506 and the slope of the mirror coated surface 516 of the prism 506 can be adjusted to reduce differences in length of light paths between the fingerprint of the user and the image sensor. For example, a difference in length between a first light path represented by numerals 522a and 522b and a second light path represented by numerals 524a and 524b can be reduced. By reducing the differences in length of the light paths between the fingerprint of the user and the image sensor, the quality of the captured fingerprint image can be further improved. Note that the drawing is made for illustration purposes only, it may not be precise or to scale.

FIG. 5C illustrates a method of reducing ambient background noise in a fingerprint sensing apparatus according to aspects of the present disclosure. The components of the fingerprint sensing apparatus shown in FIG. 5C are the same as in FIG. 5A, and thus their descriptions are not repeated here. As shown in FIG. 5C, ambient light, represented by numeral 532, may enter from the contacting surface of the fingerprint sensing apparatus, which is then reflected by the mirror coated surface 516. The reflected ambient light, represented by numeral 534, may then be absorbed by the surface 514, which is painted black to reduce background noise.

FIG. 5D illustrates a side view of the prism of the fingerprint sensing apparatus according to aspects of the present disclosure. As shown in FIG. 5D, portions of the outer boundary of the prism 506 is painted black, represented by area 509a, to improve the quality of the fingerprint image received at the image sensor 512 through the lens 510 (as shown in FIG. 5C). The inner boundary of the prism 506 is configured to allowed the fingerprint image to pass through to the image sensor 512 through the lens 510 (as shown in FIG. 5C).

FIG. 5E illustrates a top view of the fingerprint sensing apparatus according to aspects of the present disclosure. The top view of the fingerprint sensing apparatus can see through the top surface of the prism. Area 514 represents the bottom region of the prism 506 that is painted black. Area 504*a* represents the curved surface of the light modifier 504 and area 504*b* represents the angled surface 505 of the light modifier 504. Area 516 represents the mirror coated surface of the prism 506.

Figure 6B:
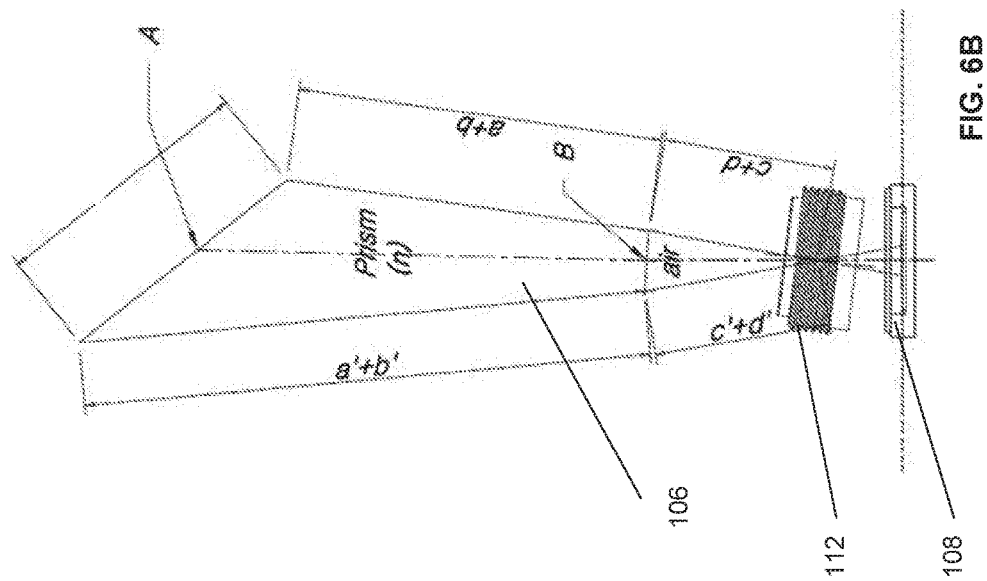
FIG. 6B illustrates an optically simplified diagram of FIG. 6A according to aspects of the present disclosure.
Figure 6A:
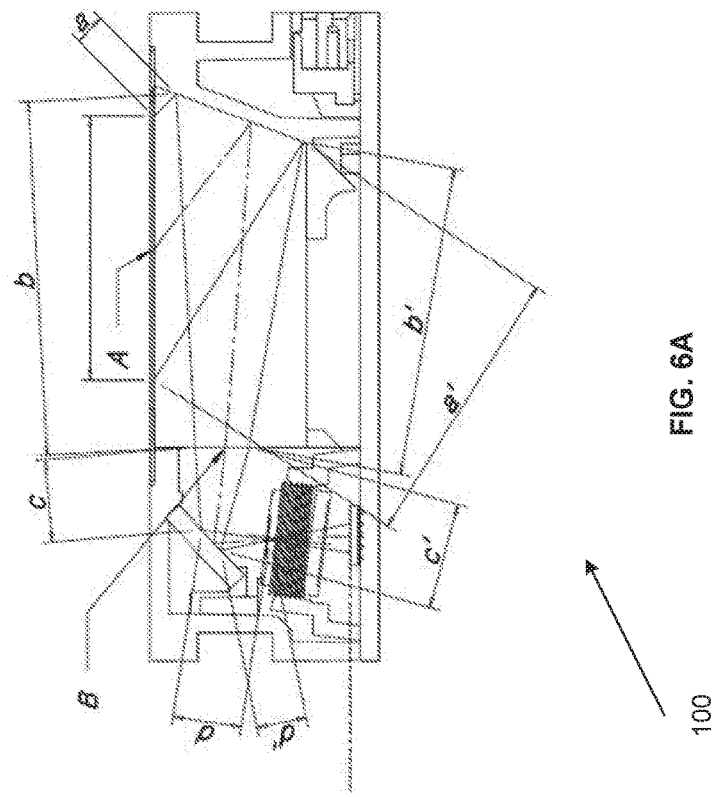
FIG. 6A illustrates exemplary light paths travelling from a fingerprint image to a finger sensor of the fingerprint sensing apparatus of FIG. 1 according to aspects of the present disclosure.

FIG. 6A illustrates exemplary light paths travelling from a fingerprint image to a finger sensor of the fingerprint sensing apparatus of FIG. 1 according to aspects of the present disclosure. Note that the descriptions of the components of the fingerprint sensing apparatus 100 of FIG. 1 are not repeated here for simplicity. As shown in FIG. 6A, point A represents a point on a surface of the prism 106 where the finger touches the fingerprint sensing apparatus 100. Point B represents a point on another surface of the prism 106 where the light path leaves the prism 106 and to be received by the lens 112 and sensor 108. Numerals a, b, c, and d represent a first light path traveled from a first edge of a finger through the prism 106 to the lens 112. Numerals a', b', c', and d' represent a second light path traveled from a second edge of the finger through the prism 106 to the lens 112.

FIG. 6B illustrates an optically simplified diagram of FIG. 6A according to aspects of the present disclosure. Similarly, point A represents a point on a surface of the prism 106 where the finger touches the fingerprint sensing apparatus 100, and point B represents a point on another surface of the prism 106 where the light path leaves the prism 106 and to be received by the lens 112 and sensor 108. In the example shown in FIG. 6B, the reflected light path by mirror 110 is straightened to conceptually simplify the optical diagram of FIG. 6A. Note that a distance travelled by the first light path may be substantially approximated to be a+b+c+d. A distance travelled by the second light path may be substantially approximated to be a'+b'+c'+d'.

Figure 6C:
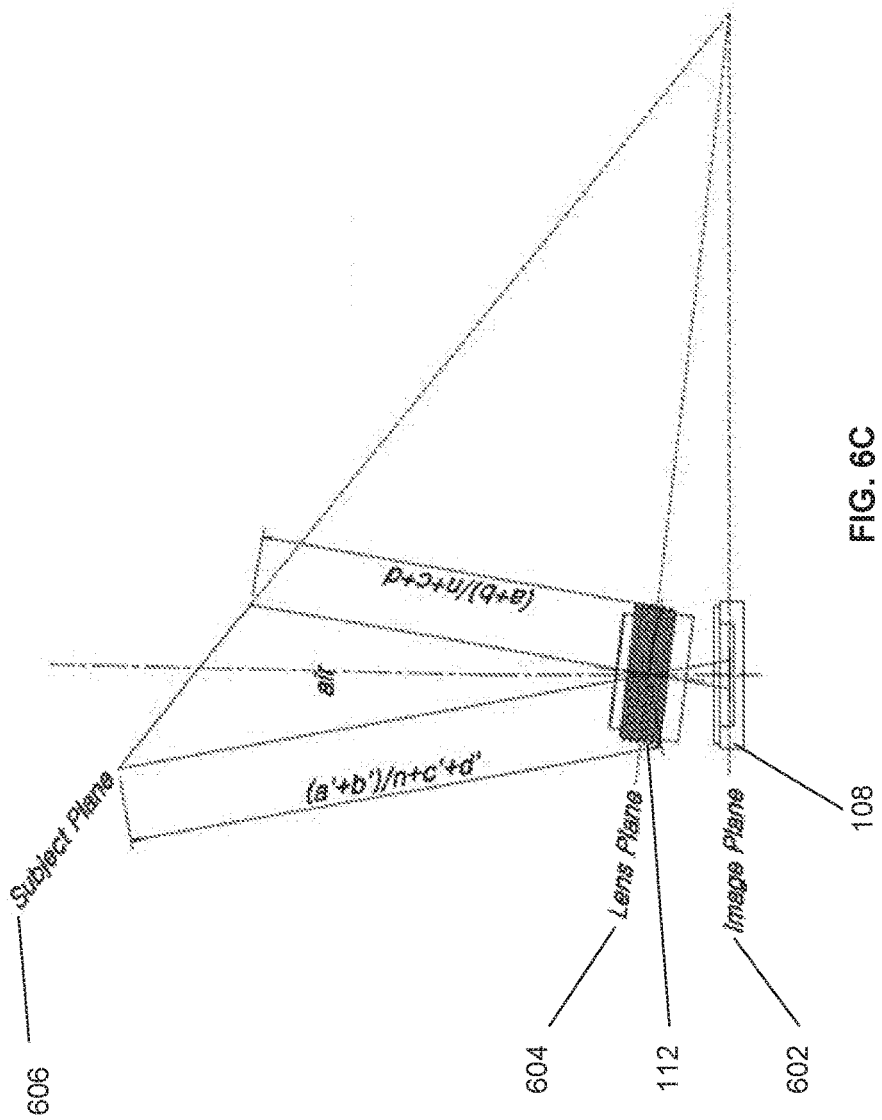
FIGS. 6C-6D illustrates an optically further simplified diagram of FIG. 6B and adjustment of a lens plane of the fingerprint sensing apparatus of FIG. 1 according to aspects of the present disclosure.
Figure 6D:
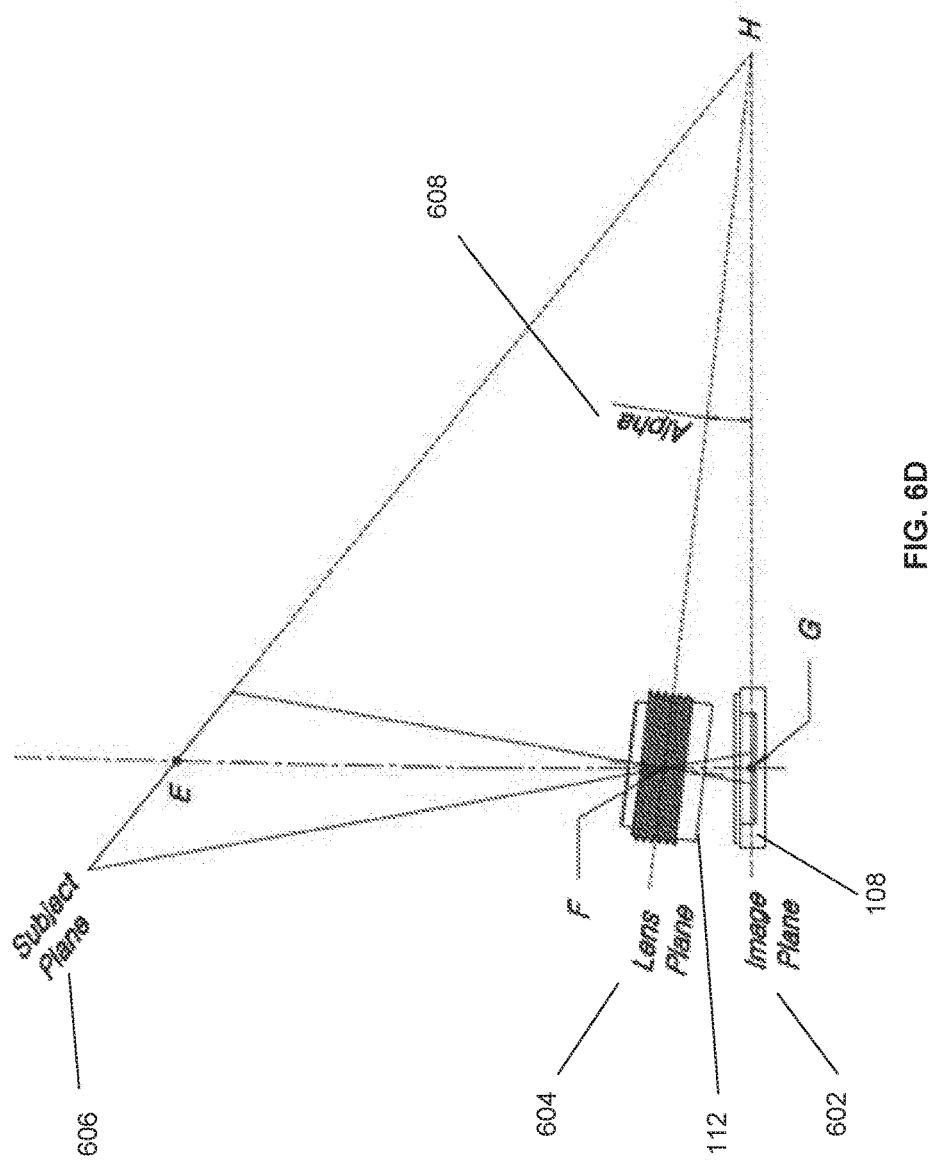

FIGS. 6C-6D illustrates an optically simplified diagram of FIG. 6B and adjustment of a lens plane of the fingerprint sensing apparatus of FIG. 1 according to aspects of the present disclosure. For simplicity of illustrating the figures on a two dimensional surface, in FIG. 6C and FIG. 6D, a plane is represented by a corresponding dotted line. A person skilled in the art would be able to extrapolate the plane from the dotted line in a three dimensional space. As shown in FIG. 6C, an image plane 602 is a plane that passes through the image sensor 108. A lens plane 604 is a plane that passes through the lens 112. A subject plane 606 can be determined based on the distance travelled by the first light path and the distance travelled by the second light path through the prism 106 and air before they reach the lens 112. In particular, to simplify the optical path through the prism plus air to only air, a first point (which corresponds to a line in 3D) of the subject plane 606 that corresponds to the first light path may be approximated to have a distance of (a+b)/n+c+d from a center point of the lens 112 on the lens plane 604. Similarly, a second point (which corresponds to a line in 3D) of the subject plane 606 that corresponds to the second light path may be approximated to have a distance of (a'+b')/n+c'+d' from the center point of the lens 112 on the lens plane 604. The dotted line that passes through the first point and the second point may form the subject plane 606.

In the example shown in FIG. 6D, the extension of the subject plane 606 and the extension of the image plane 602 intersects each other at point H. Point F indicates approximately a midpoint of the lens 112 on the lens plane 604. Point G indicates approximately a midpoint of the sensor 108 on the image plane 602. Point E indicates a point on the subject plane 606 obtained by extending a line from point G through point F to the subject plane 606. In other words, line FH represents a distance between the midpoint of the lens 112 and the point H; line GH represents a distance between the midpoint of the sensor 108 and the point H; and line EH represents a distance between the midpoint of the first light path and the second light path and the point H. According to aspects of the present disclosure, the lens 112 can be adjusted to provide a lens plane 604 that meets the intersection of the image plane 602 and the subject plane 606 at point H. The angle of adjustment, shown as Alpha 608, with respect to the image plane 602 may be computed as arccos (GH/FH).

Figure 7A:
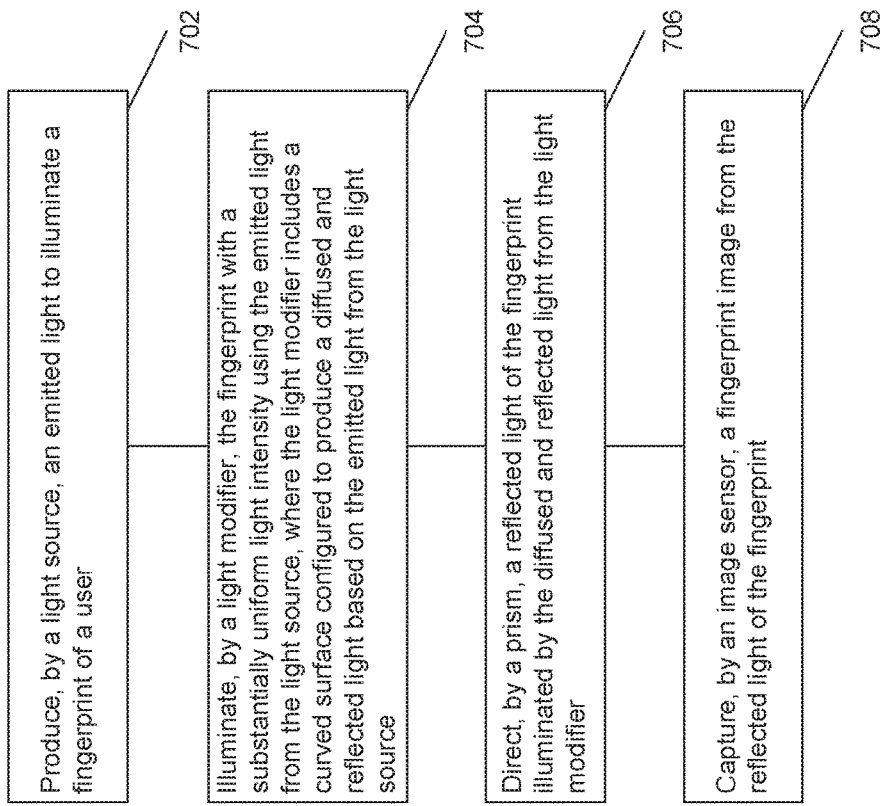
FIG. 7A illustrates an exemplary method for fingerprint sensing using a fingerprint sensing apparatus according to aspects of the present disclosure.

FIG. 7A illustrates an exemplary method for fingerprint sensing using a fingerprint sensing apparatus according to aspects of the present disclosure. In block 702, a light source produces an emitted light to illuminate a fingerprint of a user. In block 704, a light modifier illuminates the fingerprint with a substantially uniform light intensity using the emitted light from the light source, where the light modifier includes a curved surface configured to produce a diffused and reflected light based on the emitted light from the light source. In block 706, a prism directs a reflected light of the fingerprint illuminated by the diffused and reflected light from the light modifier. In block 708, an image sensor captures a fingerprint image from the reflected light of the fingerprint.

Figures 7B, 7C:
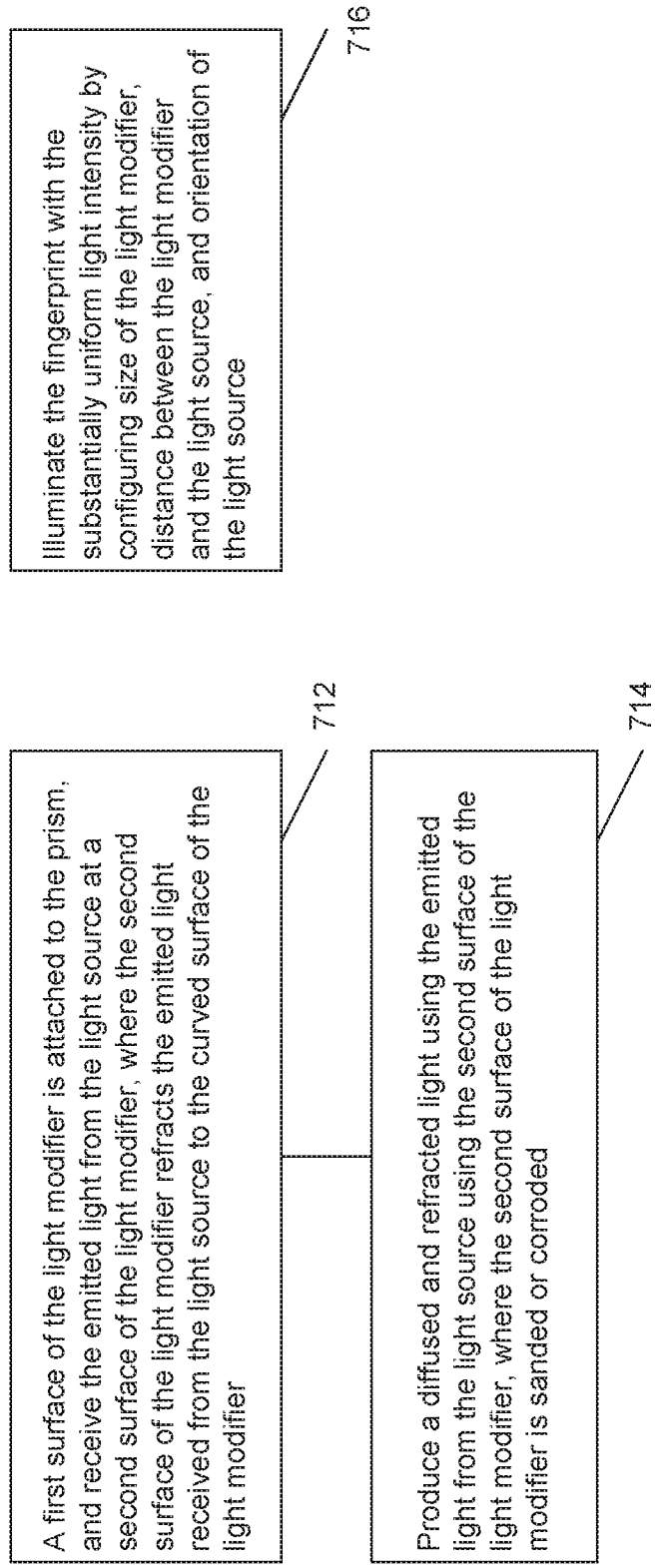
FIG. 7B illustrates an exemplary method of using a light modifier of the fingerprint sensing apparatus according to aspects of the present disclosure.
FIG. 7C illustrates an exemplary method of using the light modifier with respect to the light source of the fingerprint sensing apparatus according to aspects of the present disclosure.

FIG. 7B illustrates an exemplary method of using a light modifier of the fingerprint sensing apparatus according to aspects of the present disclosure. In block 712, a first surface of the light modifier is attached to the prism, and the light modifier is configured to receive the emitted light from the light source at a second surface of the light modifier, where the second surface of the light modifier refracts the emitted light received from the light source to the curved surface of the light modifier. In block 714, the light modifier is configured to produce a diffused and refracted light using the emitted light from the light source using the second surface of the light modifier, where the second surface of the light modifier is sanded or corroded.

FIG. 7C illustrates an exemplary method of using the light modifier with respect to the light source of the fingerprint sensing apparatus according to aspects of the present disclosure. In block 716, the light modifier is configured to illuminate the fingerprint with the substantially uniform light intensity by configuring size of the light modifier, distance between the light modifier and the light source, and orientation of the light source.

Figure 7D:
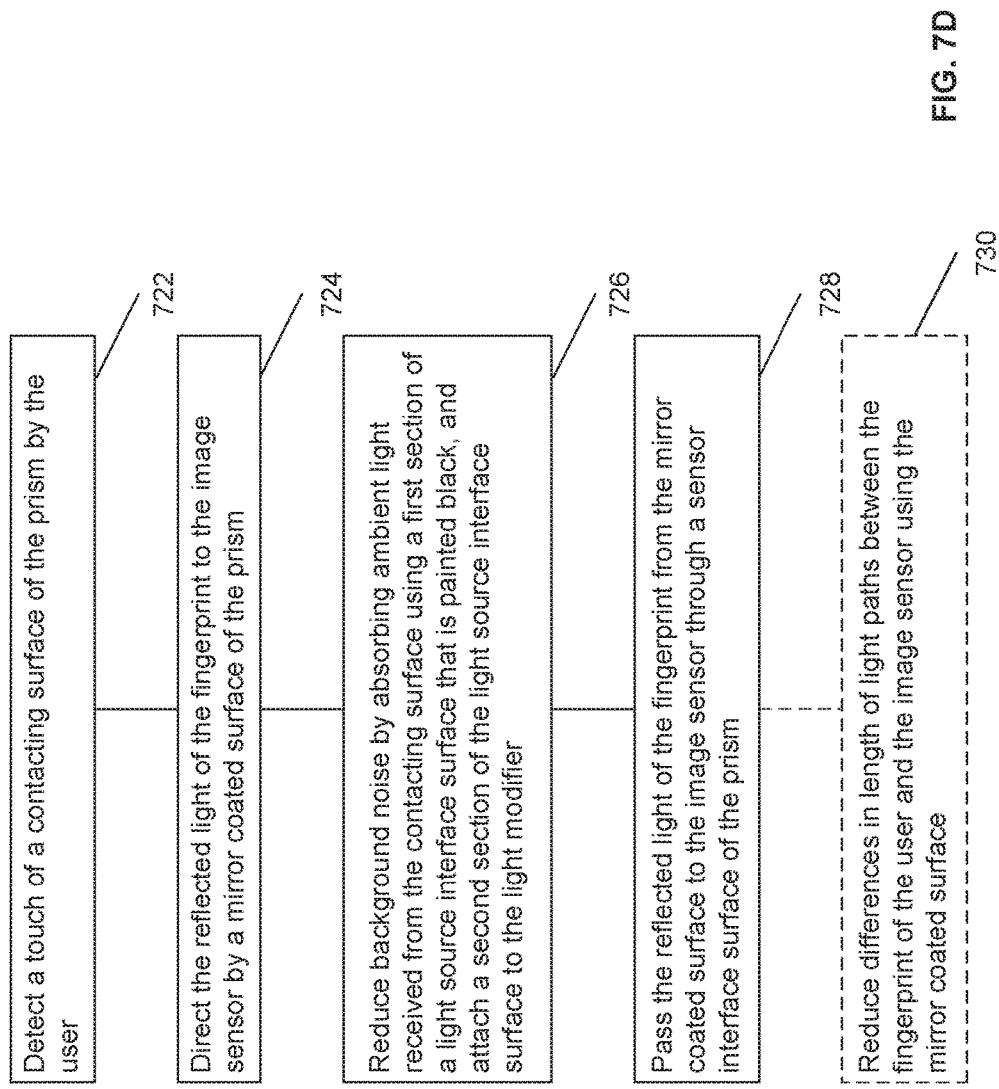
FIG. 7D illustrates an exemplary method of using a prism of the fingerprint sensing apparatus according to aspects of the present disclosure.

FIG. 7D illustrates an exemplary method of using a prism of the fingerprint sensing apparatus according to aspects of the present disclosure. In block 722, the prism is configured to detect a touch of a contacting surface of the prism by the user. In block 724, the prism is configured to direct the reflected light of the fingerprint to the image sensor by a mirror coated surface of the prism. In block 726, the prism is configured to reduce background noise by absorbing ambient light received from the contacting surface using a first section of a light source interface surface that is painted black, and attach a second section of the light source interface surface to the light modifier. In block 728, the prism is configured to pass the reflected light of the fingerprint from the mirror coated surface to the image sensor through a sensor interface surface of the prism. In some implementations, the methods performed in blocks 722 to 728 may optionally or additionally include the method performed in block 730. In block 730, the prism is configured to reduce differences in length of light paths between the fingerprint of the user and the image sensor using the mirror coated surface.

FIG. 7E illustrates another exemplary method of using the light modifier of the fingerprint sensing apparatus according to aspects of the present disclosure. In block 732, the light modifier is configured to produce the diffused and reflected light based on the emitted light from the light source by the curved surface that is sanded or corroded.

FIG. 7F illustrates exemplary methods of using the fingerprint sensing apparatus according to aspects of the present disclosure. In block 734, the fingerprint sensing apparatus may be configured to direct the reflected light of the fingerprint image from the prism to the image sensor by a mirror and a lens in the light path between the prism and the image sensor. In some implementations, the methods of using the fingerprint sensing apparatus may optionally or additionally include the method performed in block 736. In block 736, the fingerprint sensing apparatus may be configured to direct the reflected light of the fingerprint image from the prism to the image sensor by a lens in the light path between the prism and the image sensor.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, and any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A fingerprint sensing apparatus, comprising:
  a light source configured to produce an emitted light to illuminate a fingerprint of a user;
  a light modifier configured to illuminate the fingerprint with a substantially uniform light intensity using the emitted light from the light source, wherein the light modifier includes a curved surface configured to produce a diffused and reflected light based on the emitted light from the light source;
  a prism configured to direct a reflected light of the fingerprint illuminated by the diffused and reflected light from the light modifier;
  an image sensor configured to capture a fingerprint image from the reflected light of the fingerprint;
  a mirror and a lens in the light path between the prism and the image sensor, wherein the mirror and the lens are configured to direct the reflected light of the fingerprint image from the prism to the image sensor, wherein
    the image sensor is configured to provide an image plane;
    the prism and the mirror are configured to provide a subject plane, wherein the subject plane is adjusted based on the light path from the prism to the image sensor, and wherein the image plane and the subject plane are extended and are configured to form an intersection, and
    the lens is adjusted to provide a lens plane that meets the intersection of the image plane and the subject plane; and
  a housing configured to hold the light source, the light modifier, the prism, and the image sensor within the housing.

2. The fingerprint sensing apparatus of claim 1, wherein the curved surface is sanded or corroded to produce the diffused and reflected light based on the emitted light from the light source.

3. The fingerprint sensing apparatus of claim 1, wherein the prism comprises:
  a contacting surface configured to be touched by the user;
  a mirror coated surface configured to direct the reflected light of the fingerprint to the image sensor;
  a light source interface surface, wherein a first section of the light source interface surface is painted black to reduce background noise by absorbing ambient light received from the contacting surface, and a second section of the light source interface surface is configured to be attached to the light modifier; and
  a sensor interface surface configured to pass the reflected light of the fingerprint from the mirror coated surface to the image sensor.

4. The fingerprint sensing apparatus of claim 3, wherein the mirror coated surface is configured to reduce differences in length of light paths between the fingerprint of the user and the image sensor.

5. The fingerprint sensing apparatus of claim 1, wherein the light modifier further comprises:
   a first surface configured to attach the light modifier to the prism; and
   a second surface configured to receive the emitted light from the light source, wherein the second surface of the light modifier is further configured to refract the emitted light received from the light source to the curved surface of the light modifier.

6. The fingerprint sensing apparatus of claim 5, wherein the second surface of the light modifier is sanded or corroded to produce a diffused and refracted light using the emitted light from the light source.

7. The fingerprint sensing apparatus of claim 1, wherein size of the light modifier, distance between the light modifier and the light source, and orientation of the light source are configured to illuminate the fingerprint with the substantially uniform light intensity.

8. A fingerprint sensing apparatus, comprising:
   a light source configured to produce an emitted light to illuminate a fingerprint of a user;
   a light modifier prism configured to illuminate the fingerprint with a substantially uniform light intensity using the emitted light from the light source, wherein the light modifier prism includes a curved surface configured to produce a diffused and reflected light based on the emitted light from the light source;
   the light modifier prism is further configured to direct a reflected light of the fingerprint illuminated by the diffused and reflected light;
   an image sensor configured to capture a fingerprint image from the reflected light of the fingerprint;
   a mirror and a lens in the light path between the light modifier prism and the image sensor, wherein the mirror and the lens are configured to direct the reflected light of the fingerprint image from the light modifier prism to the image sensor, and wherein
      the image sensor is configured to provide an image plane;
      the light modifier prism and the mirror are configured to provide a subject plane, wherein the subject plane is adjusted based on the light path from the light modifier prism to the image sensor, and wherein the image plane and the subject plane are extended and are configured to form an intersection; and
      the lens is adjusted to provide a lens plane that meets the intersection of the image plane and the subject plane; and
   a housing configured to hold the light source, the light modifier prism, and the image sensor within the housing.

9. The fingerprint sensing apparatus of claim 8, wherein the curved surface is sanded or corroded to produce the diffused and reflected light based on the emitted light from the light source.

10. The fingerprint sensing apparatus of claim 8, wherein the light modifier prism comprises:
   a contacting surface configured to be touched by the user;
   a mirror coated surface configured to direct the reflected light of the fingerprint to the image sensor;
   a light source interface surface, wherein a first section of the light source interface surface is painted black to reduce background noise by absorbing ambient light received from the contacting surface; and
   a sensor interface surface configured to pass the reflected light of the fingerprint from the mirror coated surface to the image sensor.

11. The fingerprint sensing apparatus of claim 10, wherein the mirror coated surface is configured to reduce differences in length of light paths between the fingerprint of the user and the image sensor.

12. The fingerprint sensing apparatus of claim 10, wherein the light modifier prism further comprises:
   a second surface configured to receive the emitted light from the light source, wherein the second surface of the light modifier prism is further configured to refract the emitted light received from the light source to the curved surface of the light modifier prism.

13. The fingerprint sensing apparatus of claim 12, wherein the second surface of the light modifier prism is sanded or corroded to produce a diffused and refracted light using the emitted light from the light source.

14. The fingerprint sensing apparatus of claim 10, wherein size of the light modifier prism, distance between the light modifier prism and the light source, and orientation of the light source are configured to illuminate the fingerprint with the substantially uniform light intensity.

15. A method for reducing fingerprint image distortion, comprising:
   producing, by a light source, an emitted light to illuminate a fingerprint of a user;
   illuminating, by a light modifier, the fingerprint with a substantially uniform light intensity using the emitted light from the light source, wherein the light modifier includes a curved surface configured to produce a diffused and reflected light based on the emitted light from the light source;
   directing, by a prism, a reflected light of the fingerprint illuminated by the diffused and reflected light from the light modifier;
   directing, by a mirror and a lens in the light path between the prism and an image sensor, the reflected light of the fingerprint image from the prism to the image sensor, wherein
      the image sensor is configured to provide an image plane;
      the prism and the mirror are configured to provide a subject plane, wherein the subject plane is adjusted based on the light path from the prism to the image sensor, and wherein the image plane and the subject plane are extended and are configured to form an intersection; and
      the lens is adjusted to provide a lens plane that meets the intersection of the image plane and the subject plane; and
   capturing, by the image sensor, a fingerprint image from the reflected light of the fingerprint.

16. The method of claim 15, wherein the curved surface is sanded or corroded to produce the diffused and reflected light based on the emitted light from the light source.

17. The method of claim 15, wherein the prism comprises:
   a contacting surface configured to be touched by the user;
   a mirror coated surface configured to direct the reflected light of the fingerprint to the image sensor;
   a light source interface surface, wherein a first section of the light source interface surface is painted black to reduce background noise by absorbing ambient light received from the contacting surface, and a second section of the light source interface surface is configured to be attached to the light modifier; and a sensor interface surface configured to pass the reflected light of the fingerprint from the mirror coated surface to the image sensor.

18. The method of claim 17, wherein the mirror coated surface is configured to reduce differences in length of light paths between the fingerprint of the user and the image sensor.

19. The method of claim 15, wherein the light modifier further comprises:

a first surface configured to attach the light modifier to the prism; and a second surface configured to receive the emitted light from the light source, wherein the second surface of the light modifier is further configured to refract the emitted light received from the light source to the curved surface of the light modifier.

20. The method of claim 19, wherein the second surface of the light modifier is sanded or corroded to produce a diffused and refracted light using the emitted light from the light source.

21. The method of claim 20, wherein size of the light modifier, distance between the light modifier and the light source, and orientation of the light source are configured to illuminate the fingerprint with the substantially uniform light intensity.

* * * * *